United States Patent [19]

Williams

[11] 3,981,592

[45] Sept. 21, 1976

[54] SYSTEM FOR LOCATING BREAKS IN FIBER OPTIC FILAMENTS

[75] Inventor: Donald N. Williams, San Diego, Calif.

[73] Assignee: The United States of America as represented by the Secretary of the Navy, Washington, D.C.

[22] Filed: Mar. 31, 1975

[21] Appl. No.: 563,751

[52] U.S. Cl. .............................. 356/237; 250/199; 250/227; 250/339; 356/5; 356/239
[51] Int. Cl.² ..................... G01N 21/16; G01C 3/08
[58] Field of Search .................. 356/4, 5, 237, 239; 250/227, 562, 572, 339, 199; 350/96 C

[56] References Cited
UNITED STATES PATENTS

| | | | |
|---|---|---|---|
| 3,728,026 | 4/1973 | Idestrom et al. ........................ | 356/5 |
| 3,743,419 | 7/1973 | Skagerlund ............................. | 356/5 |
| 3,884,585 | 5/1975 | Lebduska .............................. | 356/239 |

*Primary Examiner*—Vincent P. McGraw
*Attorney, Agent, or Firm*—R. S. Sciascia; G. J. Rubens; J. W. McLaren

[57] ABSTRACT

A system for locating breaks in fiber optic filaments employs light energy pulses which are controlled to be emitted at determinable times and directed along the light path of the fiber optic filaments under test. A pulse detector is positioned to receive any reflected pulse light energy from the fiber optic filaments and an indicator is responsive for indicating the elapsed time between the emission of the pulses and the reception of the reflected pulse light energy, preferably calibrated in terms of distance to establish the location of breaks in the fiber optics line.

6 Claims, 1 Drawing Figure

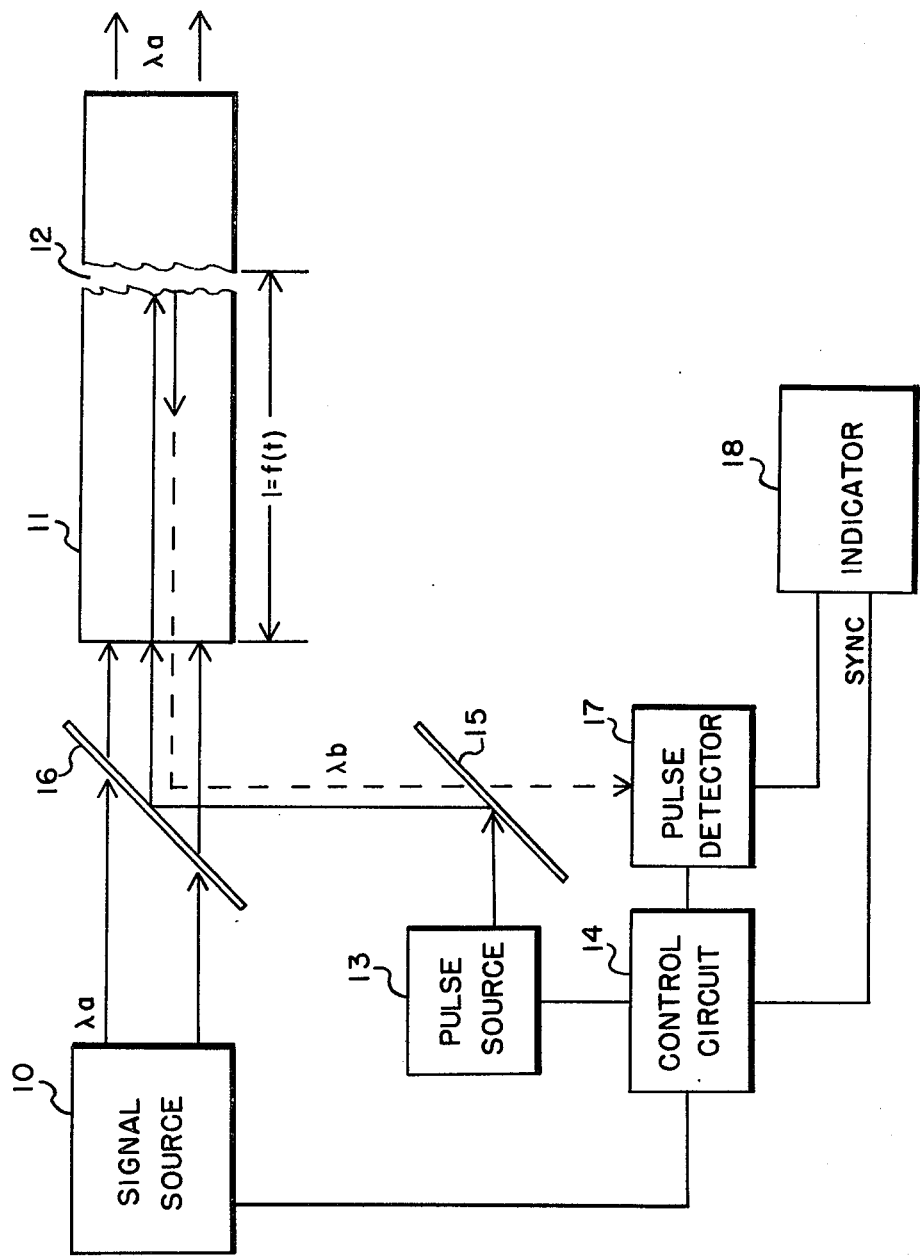

SYSTEM FOR LOCATING BREAKS IN FIBER OPTIC FILAMENTS

BACKGROUND OF THE INVENTION

Electro conductors such as wires, for example, have traditionally and conventionally been used to transmit signal information in many communication types of systems. One major disadvantage of the electrical transmission of signal information in communication systems is, however, that the break in one strand of a multi-element electrically conductive communication line cannot be readily detected. Another equally important disadvantage of the electrical transmission of signal information is the fact that electrical current conductors produce external electric and electromagnetic fields which are a function of the signal currents flowing in the conductors. Such fields may be detected and the signal information discerned external of the conductor and its insulation without disturbing or interrupting the signal current flow in any way. Thus, it is difficult, if not impossible, to provide an entirely "secure" communication system using electrical conduction for the transmission of signal information.

Even the employment of extensive shielding techniques cannot always reduce the external electric and electromagnetic fields below detectable levels to render the transmitted signal information entirely "secure." Another expedient which has been used in the prior art to render electrically conductive communication systems "secure" is to cryptographically encode the signal information. In using cryptographic techniques, however, additional equipments are required including encoding devices at the transmission end of the system and decoding devices at each of the reception points in the system. Thus, shielding and cryptographic encoding techniques involve substantial additional cost as well as a considerable degree of added complication in such systems.

The use of fiber optics for the transmission of signal information in communication systems between sending and receiving terminals has a primary advantage over comparable electrically transmitting systems in that the fiber optics arrangement can provide a relatively simple and "secure" means of transmitting information. Fiber optic cables may be single filament, several filaments, or multi-filaments of several hundred optical fibers. Each fiber is a wholly independent optical waveguide in its operation in that it contains and transmits its signal completely within each fiber and no field of optical energy is produced which may be externally detected or monitored in any way.

Consequently, fiber optic signal information transmission provides a wholly secure system unless one or more of the filaments in a fiber optic cable is ruptured or cut to intercept and detect the signal information being transmitted along the broken fiber.

Accordingly, it is highly desirable that a method and system be provided to detect the rupture of fibers in a fiber optic communication system. Additionally, it is most advantageous that such a method and system for detection of breaks in fiber optic filaments be capable of determining and revealing the location of such a rupture or break in the optical path provided by the fiber optic cable.

SUMMARY OF THE INVENTION

When a break or rupture occurs for any reason, whether it be inadvertent or purposeful, in a fiber optic cable the broken filament or filaments constitute an optical interface by reason of the difference between the refractive index of the filament itself and the medium immediately adjacent its broken end such as air, for example.

Such an optical interface will cause some amount of optical energy to be reflected back along the optical path of the broken optical fiber. Typically, such reflected optical energy may be of the order of approximately 5% of the optical energy traversing the broken optical fiber.

The optical energy employed for signal transmission is not however, usually sufficient to produce a discernible amount of reflected signal energy indicative of a break in a fiber optic filament because the transmitted optical energy is customarily adjusted to the minimum for the lowest acceptable level of transmission quality desired.

Accordingly, the present invention contemplates the employment of a second source of light energy which is used as the detection signal. Such a source of light energy for a detection signal is preferably in a pulsed form and may be within the spectral range of the transmitted signal optical energy in which case the pulsed detection signal is preferably interlaced with the transmission of the signal optical energy. Alternatively, the pulsed detection signal may be of a different wavelength or frequency from that of the signal optical energy so as to be readily distinguishable.

The pulsed light energy employed for detection is controlled for emission at determinable time intervals, preferably so that successive pulses have a time interval therebetween which is not less than the total time required for the light energy to traverse the entire length of the unbroken light path provided by the fiber optic filaments and for return to its point of origin. Those knowledgeable and skilled in the pertinent arts will appreciate that detection pulses of optical energy having any lesser time interval between successive pulses may lead to problems in distinguishing and detecting the precise time disposition of reflected detection pulse optical energy.

In accordance with the concept and teaching of the present invention, the pulse detector is located at the transmitting end of the fiber optic filaments and positioned to receive reflected pulse light energy from the fiber optic filaments. An indicator is arranged to be responsive to both the control circuit which initiates the emission of the pulsed light energy, and also responsive to the output of the pulse detector for indicating the elapsed time between the emission of the pulses and the reception of the reflected pulse light energy.

Such elapsed time is a function of both the speed of propagation of the pulsed light energy and the distance traveled. Since the propagation speed of the pulsed light energy is readily determinable and substantially constant, the elapsed time between the emission and the reception of the pulsed detection light energy is a function of the distance traveled along the optical path of the fiber optic filament to the point of the break and its return. Thus, such elapsed time may readily be calibrated in terms of distance along the optical path of the fiber optic element, establishing the location of the break or rupture in the filament which causes the reflected pulse energy.

In a preferred embodiment of the present invention the control circuit which is operative to actuate the pulse source of optical energy may also be operative to gate the pulse detector for predetermined time intervals in synchronism with the initiation of pulse optical energy from the pulse source.

Accordingly, it is a primary object of the present invention to provide a system and method for locating breaks in fiber optic filaments.

An equally important primary object of the present invention is to provide a system and method for detection of damage in the optical path provided by fiber optic filaments which could compromise the security of optical signal information transmission systems.

Another object of the present invention is to provide such a method and system for locating breaks in fiber optic filaments which is operative to perform its function without interfering with the normal optical energy signal transmission.

A further object of the present invention is to provide such a method and system for the detection of breaks in the fiber optic filament which will provide an immediate indication of such breaks and their precise location in terms of distance from one end of the optical path provided by the fiber optic filament.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The drawing illustrates a preferred embodiment of the present invention.

DESCRIPTION OF THE PREFERRED EMBODIMENT

The drawing illustrates a preferred embodiment of the system and method conceived by the present invention which provides for detection of the existence, and also the determination of location, of a break in a fiber optic filament such as may be used to provide an optical path in a fiber optic communication system.

In the drawing FIGURE, a signal source 10, which may be modulated and coded or otherwise operative to represent signal information, is positioned to emit its optical energy for propagation along a fiber optic path 11 comprised of a single filament or a multi-filament bundle. The signal source emits optical energy of the wavelength $\lambda_a$ and, as is illustrated in the drawing, the transmitted signal information emerges from the terminating end of the fiber optic filament 11 in the form of optical energy of the wavelength $\lambda_a$.

One of the characteristics of operation of fiber optic filaments is that each fiber functions as a wholly independent optical waveguide even though the fiber optic cable may be constituted of as many as several hundred or more such fibers.

Accordingly, each fiber element is completely independent of the other in its operation so that no light is scattered between contiguous fibers, nor is there any light field produced adjacent to the fiber optic bundle, whether or not an opaque external cladding encloses the bundle of fiber optic elements.

This optical characteristic of fiber optic filaments provides the advantage of security for the transmission of signal information, as contrasted to electrical conductors which exhibit the characteristic of creating external electric and electromagnetic fields by reason of current flow of signal information along the electrically conductive material within an electrical cable.

Additionally, the operative characteristics of fiber optic filaments are useful for the detection and precise location of a break in one or more filaments of a fiber optic cable because such break or rupture in any one or more filaments will produce an optical interface by reason of the change of refractive index existing at the break in the filament. Such a break in a filament is represented schematically in greatly enlarged form in the illustration of the drawing is indicated by the discontinuity 12 in the fiber optic 11.

The discontinuity 12 as represented in the illustration of the drawing will cause a small amount of reflection of the order of possibly 5% of optical energy propagating along the optical path of the fiber optic element which is so broken. Accordingly, most but not all signal information originating from the signal source 10 at the wavelength $\lambda_a$ will continue to propagate the entire length of other fiber optic elements that are not broken and emit at the terminating end as indicated in FIG. 1. The property of the break which results in a partial reflection of some of the light energy propagating along that portion of the optical path defined by the broken fiber optic filament affords a useful element within the concept and teaching of the present invention for immediate detection and location of the break.

As illustrated in the drawing, a pulse source 13 is provided which emits optical energy of a predetermined wavelength in pulse form under the control of an appropriate control circuit 14. Reflective elements 15 and 16 are disposed to direct the pulse optical energy to the fiber optic filament which it is desired to examine for breaks or rupture. Thus, the pulse light energy is caused to propagate along the optical path provided by the fiber optic element 11 and at the point of break or rupture 12 a portion of such pulse optical energy is reflected as indicated by the dash line. The reflected energy is returned to the reflective optical element 16 and through the beam-splitter type of reflective optical element 15. A pulse detector 17 is positioned to receive the reflected pulse light energy and produce an output indicative of the reception of such reflected pulse light energy.

The output of the pulse detector 16 is fed as one of two inputs to an indicator 18. The other input to the indicator 18 is generated by the control electronic circuit 14 and is simultaneous with the signal causing the pulse source 13 to emit its pulse light energy. The indicator 18 is operative to present an indication of the existence of a break or rupture in the fiber optic element under test and also to indicate the location of such break or rupture, preferably in terms of distance from one end of the fiber optic filament under test.

OPERATION

In operation, the control circuit 14 functions to initiate the emission of pulse light energy from the pulse source 13 and at the same time provides a simultaneous signal to the indicator 18. In a preferred embodiment of the present invention, the control circuit 14 may also provide a gate which actuates the pulse detector 16 at an appropriate time following the emission of pulse light energy from the pulse source 13.

The pulse light energy is then directed through the optical devices 15 and 16 to the fiber optic filament under test 11 along which it propagates to the point of the break 12. The pulse light energy is partially reflected and returned along its initial optical path, including redirection by optical elements 16 and 15, for reception by the pulse detector 17 which provides an output indicative of the receiption of the reflected pulse light energy.

The output of pulse detector 17 is fed as the second input to the indicator 18 which provides the capability of measuring the elapsed time between the initiation of the pulse light energy propagated along the fiber optic element 11 under test and its reception and detection by the pulse detector 17. Such elapsed time is a measure of the distance traversed by the pulse light energy.

For example, a typical propagation time for infrared light energy is approximately 1.6 nanoseconds per foot. Accordingly, the length $l$ as shown in the drawing will equal $f(t)$, where $f$ equals the feet propagation per unit time. In a preferred embodiment of the present invention the indicator 17 is calibrated to directly indicate the distance to a detected break in terms of feet or other appropriate measurement and such calibration takes into account the distance which is necessary for the pulse light energy to travel both before its entry upon the optical path provided by the fiber optic element under test and also after its reflected portion emerges from the fiber optic element under test. The remaining time measured is, of course, the time required to traverse the distance to the break and return within the fiber optic filament and the calibration takes this double distance into account.

Those skilled and knowledgeable in the pertinent arts will readily appreciate that it is highly desirably to gate the pulse detector 17 in synchronism with the emission of pulse light energy from the pulse source 13 so that the pulse detector 17 is operative only to respond to those reflected signals which it is desired to detect and does not respond to false signals.

Additionally, where the wavelength of the pulse source 13 approximates the wavelength of the signal source 10 it is desirable, if possible, to interlace the emission and propagation of pulse light energy from the pulse source 13 with the signal information emitted from the signal source 10 so that each is propagated along the optical path provided by the fiber optic element 11 without interference with the other. To give effect to the interlace mode of operation, signal source 10 may be connected to the control circuit 14 as shown in the drawing to provide that the control circuit 14 will only be operative to permit the emission of pulse light energy when the signal source 10 is not actively producing signal information for propagation along the optical path including the fiber optic element 11.

Alternatively, if such an interlace or multiplexing mode of operation is not possible, the pulse source 13 may be so chosen as to emit a wavelength of pulse light energy which differs from the wavelength $\lambda_a$ of the signal source 10. In this latter mode of operation, both wavelengths of light energy in the form of signal information emitting from the signal source 10 and pulse light energy emitting from the pulse source 13 may be propagated along the optical path including fiber optic element 11 at the same time without interferring with each other. The signal information of wavelength $\lambda_a$ will emit from the terminal of the optical path including fiber optic element 11 except for that amount of signal information of wavelength $\lambda_a$ which is reflected or dissipated as a result of the break. The transmitted light energy is detected by a suitable detection means which is preferably only responsive to light energy of the wavelength $\lambda_a$ and rejects all other wavelengths of light energy including the wavelength $\lambda_b$. Similarly, the pulse detector 17 may preferably be made responsive only to light energy of the wavelength $\lambda_b$ which is indicative of the reflected pulse light energy due to the break 12 in the fiber optic filament 11.

Those knowledgeable in the pertinent arts will readily appreciate that the concept of the present invention is such that it may be applied to virtually any fiber optic transmission system and also may be implemented through the use of a broad range of wavelengths of pulse light energy. Such pulse light energy need not be limited to visible light, but may also be effectively and efficiently implemented through the use of infrared and other wavelengths as may be desirable, convenient, or necessary to carry out the spirit and teaching of the present invention.

Obviously many modifications and variations of the present invention are possible in the light of the above teachings. It is therefore to be understood that within the scope of the appended claims the invention may be practiced otherwise than as specifically described.

What is claimed is:

1. A system for locating breaks in fiber optic filaments transmitting light energy signal information from a first source comprising:
    a second source of light energy pulses having a frequency distinguishably different from said light energy signal information;
    means for directing said pulses along the light paths defined by the disposition of said fiber optic filaments;
    a control circuit for controlling the emission of said pulses from said second source at a determinable time;
    a pulse detector positioned to receive reflected pulse light energy from said fiber optic filaments; and
    an indicator responsive to said control circuit and said pulse detector for indicating the elapsed time between the emission of said pulses and the reception of said reflected pulse light energy, whereby to establish the total distance along said light path to the location of breaks in said fiber optic filaments including curvilinear distances due to said disposition of said fiber optic filaments.

2. A system for locating breaks in fiber optic filaments as claimed in claim 1 wherein the wavelengths of said pulses and said light energy signal information are both within the infrared spectrum.

3. A system for locating breaks in fiber optic filaments as claimed in claim 1 wherein said control circuit is responsive to said first source of light energy signal information for interlacing the emission of said pulses between transmissions of said light energy signal information.

4. A system for locating breaks in fiber optic filaments as claimed in claim 1 wherein said indicator is calibrated to indicate said elapsed time in terms of distance along the light path of said fiber optic filaments.

5. A system for locating breaks in fiber optic filaments as claimed in claim 1 wherein the time interval between the emission of successive pulses is not less than the time required for said light energy to traverse the entire length of said light path and return to its point of origin.

6. A system for locating breaks in fiber optic filaments as claimed in claim 1 wherein said control circuit is operative to gate said pulse detector for predetermined time periods in synchronism with the emission of pulses from said source of light energy pulses.

* * * * *